(12) United States Patent
Inada

(10) Patent No.: US 6,380,296 B1
(45) Date of Patent: Apr. 30, 2002

US006380296B1

(54) INTERIOR RESIN ARTICLE

(75) Inventor: Toshiaki Inada, Chiba (JP)

(73) Assignee: Nitto Boseki Co., Ltd., Fukushima (JP)

(*) Notice: Subject to any disclaimer, the term of this patent is extended or adjusted under 35 U.S.C. 154(b) by 0 days.

(21) Appl. No.: 09/581,508

(22) PCT Filed: Oct. 5, 1999

(86) PCT No.: PCT/JP99/05494

§ 371 Date: Jul. 11, 2000

§ 102(e) Date: Jul. 11, 2000

(87) PCT Pub. No.: WO00/23518

PCT Pub. Date: Apr. 27, 2000

(30) Foreign Application Priority Data

Oct. 16, 1998 (JP) .......................................... 10-295388
Oct. 16, 1998 (JP) .......................................... 10-295500

(51) Int. Cl.$^7$ ............................. C08L 23/00; E04F 15/10
(52) U.S. Cl. ........................ 524/445; 524/451; 524/500; 524/502; 524/503; 524/515; 524/522; 524/533; 428/476.3
(58) Field of Search ................................ 524/445, 451, 524/500, 502, 503, 515, 522, 533; 428/476.3

(56) References Cited

U.S. PATENT DOCUMENTS 5,017,659 A * 5/1991 van der Groep ............ 525/222

FOREIGN PATENT DOCUMENTS

| | | |
|---|---|---|
| EP | 683205 | 5/1995 |
| EP | 742098 | 11/1996 |
| JP | 6-182922 | 7/1994 |
| JP | 9-207276 | 8/1997 |
| JP | 9-317142 | 12/1997 |
| JP | 10-45962 | 2/1998 |
| JP | 10-102748 | 4/1998 |
| JP | 11-48416 | 2/1999 |

* cited by examiner

Primary Examiner—Nathan M. Nutter
(74) Attorney, Agent, or Firm—Nixon Peabody LLP; David S. Safran

(57) ABSTRACT

A polyolefin resin type interior material which contains neither a halogen nor a phthalate series plasticizer, is equivalent to a conventional PVC resin type interior material in the properties such as scratch resistance, designing applicability and workability, exhibits excellent adherence with an adhesive conventionally used for an interior material is obtained from a mixture comprising 10 to 45 parts by weight of an ethylene-vinyl acetate copolymer having a vinyl acetate concentration of at least 50 wt. %, 55 to 90 parts by weight of a polyolefin resin, and 100 to 700 parts by weight of an inorganic filler, said ethylene-vinyl acetate copolymer having a melt flow rate (which will be abbreviated as "MFR") greater by at least 20 g/10 min than said polyolefin resin.

12 Claims, No Drawings

INTERIOR RESIN ARTICLE

FIELD OF THE INVENTION

The present invention relates to interior materials made of a polyolefin resin. More specifically, the present invention pertains to resin type interior materials (ex. floor material, skirt) which can be substituted for conventional PVC resin type interior materials, have excellent scratch resistance, designing applicability and workability and exhibit excellent bond strength or adherence particularly when an adhesive or wax conventionally used for an interior material is employed.

DESCRIPTION OF THE RELATED ART

PVC resins have come to be used widely because they can be easily molded or formed and have excellent designing applicability, and when used as an interior material such as floor material or skirt, have excellent workability and abrasion resistance.

Reflecting much concern for environmental problems in recent years, however, the use of PVC resins is limited because they emit toxic gases such as hydrogen chloride gas or dioxin upon combustion or a phthalate ester plasticizer contained in them is presumed to adversely affect the human body as an endocrine-disturbing substance in the environment. Under such circumstances, polyolefin type interior materials which contain neither halogen nor plasticizers have been proposed. For example, a longer floor material comprising a polyolefin, an ethylene-vinyl acetate copolymer (EVA), and a modified olefin resin or olefin-acrylic copolymer is described in unexamined published Japanese Patent Application JP-A-11-48416.

Polyolefin resins such as polyethylene and polypropylene are, however, not polar compounds. Even if a resin, such as general-purpose EVA (having a polar group concentration of 50% or less) or EEA (ethylene-ethyl acrylate copolymer), having a polar group is incorporated, sufficient adhesive force is not obtained when an adhesive ordinarily employed for interior materials is used. Owing to the same reason, use of a conventional wax for floor materials does not bring about sufficient adherence in the floor material. Moreover, since the resin has high crystallinity, the workability as an interior material is not good and there remains a problem in resistance against whitening on bending particularly when the interior material is a skirt.

SUMMARY OF THE INVENTION

An object of the present invention is, therefore, to provide a polyolefin type interior material which contains neither a halogen nor a phthalate ester plasticizer, has equivalent properties to the PVC type interior material and in particular, exhibits excellent bonding property when an adhesive conventionally employed for interior materials is used.

Another object of the present invention is to provide a polyolefin type interior material having excellent designing applicability and workability and, moreover, having excellent scratch resistance.

A further object of the present invention is to provide a polyolefin type floor material, particularly, a tile-shaped floor material having, in addition to the above-described properties, excellent abrasion resistance and excellent adherence with a wax.

Still a further object of the present invention is to provide a polyolefin type skirt which has, in addition to the above-described properties, excellent resistance against whitening on bending.

DETAILED DESCRIPTION OF THE INVENTION

It has been found that the above-described objects are attained by a resin type interior material which comprises 10 to 45 parts by weight of an ethylene-vinyl acetate copolymer having a vinyl acetate concentration of at least 50 wt. %, 55 to 90 parts by weight of a poloyolefin resin, and 100 to 700 parts by weight of an inorganic filler, wherein the ethylene-vinyl acetate copolymer has a melt flow rate (which will hereinafter be abbreviated as "MFR") greater by at least 20 g/10 min than the polyolefin resin.

An interior material composed of, as a basic resin, an ethylene-vinyl acetate copolymer having a vinyl acetate content of 50% or greater and a large MFR and a polyolefin resin having a small MFR at a predetermined ratio is, as is apparent from the test data which will be described later, extremely superior to the conventional polyolefin type interior material in adherence with various adhesives or waxes.

The reasons why the adherence of the resin type interior material of the present invention has markedly improved adherence with an adhesive or wax are as follows:

(1) The above-described ethylene-vinyl acetate copolymer has a vinyl acetate content of 50% or greater, indicating that it contains a polar group at a markedly high concentration.

(2) Since the ethylene-vinyl acetate copolymer has an MFR larger by about at least 20 g/10 min than another resin component, in other words, the MRF of the ethylene-vinyl acetate copolymer having a high polar function is largely different from that of another resin component, it is not completely compatible with the mixture, but, is dispersed in the whole system as fine particles. It scatters in the whole system while having a high polar group concentration.

The ethylene-vinyl acetate copolymer having a high polar function takes the dispersed form because it has low crystallinity and is flexible, as a result, a sheet obtained from it has flexibility.

The ethylene-vinyl acetate copolymer has a vinyl acetate content of 50% or greater, preferably 60 to 80%. At a vinyl acetate content of less than 50%, effects for improving the adherence with an adhesive or wax do not appear because the concentration of a polar group is too low.

The ethylene-vinyl acetate copolymer having a high vinyl acetate content (which may hereinafter be called "polar group content") has an MFR larger by at least 20 g/10 min, preferably at least 30 g/10 min than another resin components (such as polyolefin resin). When the difference of MRF is smaller than 20 g/10 min, the difference between the ethylene-vinyl acetate copolymer having a high polar group content and another resin in MRF becomes smaller and it becomes difficult to form a fine-particle-dispersed structure, making it impossible to attain good adherence.

Although no particular limitation is imposed on the MRF of the ethylene-vinyl acetate copolymer having a high polar group content insofar as it is greater by at least 20 g/10 min than that of a polyolefin resin, it preferably falls within a range of 40 to 100 g/10 min, with a range of 40 to 80 g/10 min being particularly preferred. The MFR of the polyolefin resin preferably falls within a range of 1 to 20 g/10 min, particularly within a range of 1 to 10 g/10 min. At an MFR of the above-described ethylene-vinyl acetate copolymer not greater than 100 g/10 min, the resin can be crystallized sufficiently, good abrasion resistance can be attained and the stickiness of its molded or formed product can be suppressed to an appropriate degree, whereby performances as an interior material are exhibited favorably.

The "MFR" as used herein has the same meaning as melt flow index as described in JIS K 6900 (Plastics Terms) and it can be measured in accordance with JIS K 7210.

The ethylene-vinyl acetate copolymer having a high polar group content and the polyolefin resin are added in amounts of 10 to 45 parts by weight and 55 to 90 parts by weight, respectively, which can, however, be determined as needed within the above range depending on the application or kind of the interior material. Amounts of the ethylene-vinyl acetate copolymer less than 10 parts by weight cause a shortage in high-concentration polar groups to be dispersed in the whole system, thereby making it difficult to bring about the above-described effects of the present invention. When the amount is greater than 45 parts by weight, on the other hand, a portion of the resin with less crystallinity increases, causing a deterioration in abrasion resistance or causing stickiness of the molded or formed product, thereby damaging the performance of the interior material. Amounts outside the above range are, therefore, not preferred.

Although no particular limitation is imposed on the polyolefin resin to be used in the present invention, examples of the polyolefin resin include polyethylene, polypropylene, ethylene-vinyl acetate copolymer and ethylene-ethyl acrylate copolymer.

The inorganic filler is added in an amount of 100 to 700 parts by weight and can be determined as needed within this range depending on the application or kind of the interior material. Within this range, not only sufficient adherence is obtained without impairing the characteristics of the present invention, but also advantages (in rigidity, processability, cost and the like) brought by the addition of an inorganic filler are sufficiently obtained.

No particular limitation is imposed on the inorganic filler and any inorganic filler, such as calcium carbonate, magnesium carbonate, talc, silica, clay, glass fibers or synthetic natural fibers, conventionally added to resin type interior materials can be used in the present invention.

By further addition of 10 to 50 parts by weight, preferably 10 to 30 parts by weight of an ethylene vinyl acetate copolymer having a vinyl acetate concentration of 15% or less and an MRF of 1 to 20 g/10 min, preferably an MFR of 1 to 10 g/10 min, the resin type interior material of the present invention has extremely improved processability, e.g., in calendering, thereby has improved productivity. The blending properties can also be improved, which is presumed to owe that this copolymer has good compatibility with both the ethylene-vinyl acetate copolymer having a high polar group content and a large MFR and the polyolefin resin having a small MFR.

To the resin type interior material of the present invention, additives such as pigment, crosslinking agent, antioxidant, lubricant, processing aid and photostabilizer which are known as additives for resin type floor materials can be added if necessary.

The resin type interior material according to the present invention is particularly useful as a floor material or skirt of the below-described mode.

A floor material obtained by single-layer molding or forming of a mixture comprising 25 to 45 parts by weight of an ethylene-vinyl acetate copolymer having a vinyl acetate concentration of at least 50 wt. % and an MFR of 40 to 100 g/10 min, 55 to 75 parts by weight of a polyolefin resin having an MFR of 1 to 20 g/10 min and 400 to 700 parts by weight of an inorganic filler.

A skirt obtained from a mixture comprising 10 to 45 parts by weight of an ethylene-vinyl acetate copolymer having a vinyl acetate concentration of at least 50 wt. % and an MFR of 40 to 100 g/10 min, 55 to 90 parts by weight of a polyolefin resin having an MFR of 1 to 20 g/10 min and 150 to 400 parts by weight of an inorganic filler.

A detailed description will next be made of the use of the resin type interior material of the present invention as a floor material.

As is also apparent from the test data which will be described later, a floor material containing, as a basic resin, a mixture of 25 to 45 parts by weight, preferably 30 to 40 parts by weight of an ethylene-vinyl acetate copolymer having a vinyl acetate concentration of at least 50 wt. % and an MFR of 40 to 100 g/10 min and 55 to 75 parts by weight, preferably 60 to 70 parts by weight of a polyolefin resin having an MFR of 1 to 20 g/10 min is extremely superior in adherence with a conventional adhesive or wax for floor materials to a polyolefin type floor material of another composition, particularly, that does not contain 25 to 45 parts by weight of an ethylene-vinyl acetate copolymer having a vinyl acetate concentration of at least 50 wt. % and an MFR of 40 to 100 g/10 min.

When the vinyl acetate concentration of the ethylene-vinyl acetate copolymer, which must have a vinyl acetate concentration of at least 50 wt. % and an MFR of 40 to 100 g/10 min is less than 50%, the polar group concentration is too low to exhibit the effects for improving the adherence with an adhesive or wax. At an MFR of less than 40 g/10 min, the difference with another resin in MFR becomes smaller, which makes it difficult to have a fine-particle-dispersed structure, while at an MFR exceeding 100 g/10 min, the crystallinity of the resin becomes too low, thereby damaging the performance of the resulting floor material such as abrasion resistance.

When the ethylene-vinyl acetate copolymer having a vinyl acetate concentration of at least 50 wt. % and an MFR of 40 to 100 g/10 min is added in an amount of less than 25 parts by weight, high-concentration polar groups to be dispersed in the whole system become insufficient, while it is added in an amount of greater than 45 parts by weight, a resin portion with less crystallinity becomes too large, thereby damaging the performance of the resulting floor material such as abrasion resistance.

The difference in MFR with another resin also becomes small when the MFR of the polyolefin resin is 20 g/10 min or greater and it becomes impossible to have a fine-particle-dispersed structure. Abrasion resistance is improved by the use of a polyolefin resin which has an MFR of 20 g/10 min or less, preferably 10 g/10 min or less, high crystallinity and high hardness.

For the use of the interior material of the present invention as a floor material, polyethylene is particularly desired as the polyolefin resin. Although no particular limitation is imposed on the polyethylene, use of low-density polyethylene is preferred in consideration of the moldability or formability upon, for example, calendering. The use of linear low-density polyethylene improves the processability and is therefore more preferred.

An inorganic filler is added to the floor material in an amount of 400 to 700 parts by weight, more preferably, 450 to 650 parts by weight. When the amount of the inorganic filler is less than 400 parts by weight, the resin content becomes excessively large, leading not only to inconveniences in physical properties such as shortage in rigidity as a floor material having a single layer structure and increase in residual indent, but also, a cost markedly higher than that of a PVC floor material. Amounts exceeding 700 parts by weight, on the other hand, extremely deteriorate the processability. When the inorganic filler is added in an amount of 400 parts by weight or greater, the area ratio of the inorganic filler on the surface of the floor material increases compared with the composition with less inorganic filler, leading to an improvement in adherence with an adhesive or wax and also flame retardancy. Here, various known fillers for floor materials can be used. Examples of the fillers include calcium carbonate, magnesium carbonate, talc, silica, clay, glass fibers and natural synthetic fibers, with calcium carbonate powders having an average particle size of 500 μm or smaller being particularly preferred. Addition of aluminum hydroxide powders to the calcium carbonate powders yields a floor material having high flame retardancy.

The floor material according to the present invention is characterized in that it can be formed or molded as a single layer. Since the floor material is excellent in waxing properties and abrasion resistance which the surface side of the material is required to have and in adhesion which the opposite side of the material is required to have, it functions sufficiently as a floor material without forming it from plural layers. Such a single-layer molding or forming is, in addition, superior in productivity and processability, making it possible to carry out production at a low cost. Moreover, when the floor material is subjected to single-layer molding or forming, the pattern is formed continuous from the surface side to the opposite side so that the floor material is free from disappearance of the pattern by abrasion, for example, appearance of the intermediate or back-side layer from the abraded surface layer which would otherwise occur when the floor material is formed of plural layers. Thus, the floor material is able to acquire long life.

The floor material further comprising 10 to 50 parts by weight, preferably 15 to 30 parts by weight of an ethylene-vinyl acetate copolymer having a vinyl acetate content of 15% or lower and an MFR of 1 to 20 has extremely improved processability, for example, upon calendering and thereby, has improved productivity. Amounts exceeding 50 parts by weight, however, deteriorate the release from the roll such as a calendering roll, thereby deteriorating processability.

The floor material further comprising 10 to 50 parts by weight of a copolymer of methyl methacrylate (which will hereinafter be abbreviated as "MMA") and an acrylate has extremely improved scratch resistance. The homopolymer of MMA, that is, poly(methyl methacrylate), is a hard resin, so that a floor material comprising poly(methyl methacrylate) becomes hard, brittle and poor in processability. It has been found, however, that by the use of an MMA-acrylate copolymer, the resulting floor material is imparted with flexibility to some extent and good workability. Processability, for example, in kneading is also improved. These merits are presumed to appear because the melting point of the copolymer resin of MMA and an acrylate is lower than that of poly(methyl methacrylate).

Moreover, the MMA-acrylate copolymer has, in the molecular structure thereof, a polar group so that adherence with an adhesive or wax does not lower even if it is incorporated in the floor material of the present invention.

Examples of the acrylate include methyl acrylate, ethyl acrylate and butyl acrylate. When the MMA-acrylate copolymer is added in an amount of less than 10 parts by weight, the above-described effects are not exhibited. When it is added in an amount exceeding 50 parts by weight, on the other hand, the resulting floor material becomes extremely brittle and tends to have deteriorated workability. Amounts within a range of 10 to 50 parts by weight are therefore preferred, with 20 to 40 parts by weight being more preferred.

Further addition of an ethylene-acrylate-maleic anhydride terpolymer in an amount of 10 to 30 parts by weight markedly improves abrasion resistance of the floor material of the present invention. In addition, the sheet under a molten state becomes pliable (i.e., has good nerve) upon production, which improves productivity. The reason why these merits are obtained is as follows:

① the ethylene-acrylate-maleic anhydride terpolymer has good compatibility with another resin component, and
② the maleic anhydride in the ethylene-acrylate-maleic anhydride terpolymer has close adhesion with an inorganic filler, resulting in the firm adhesion of the resin components with the inorganic filler.

The above-described effects are not exhibited when the ethylene-acrylate-maleic anhydride terpolymer is added in an amount of less than 10 parts by weight. Even amounts exceeding 30 parts by weight do not bring about further improvement in abrasion resistance. Amounts of 10 to 30 parts by weight are therefore preferred, with 15 to 25 parts by weight being more preferred.

The floor material according to the present invention, further comprising 1 to 30 parts by weight, more preferably 15 to 25 parts by weight, of a tackifier such as petroleum resin or rosin, has more improved adherence with an adhesive or wax.

As is also apparent from the test data which will be described later, the performance as a floor material is enhanced only when a tackifier is added in the above-described amount to the polyolefin floor material of the present invention which already has, because of the above-described reasons, sufficiently improved adherence with an adhesive or wax. Only the addition of a tackifier to a conventional floor material does not bring about sufficient adherence with an adhesive or wax.

To the floor material of the present invention, it is possible to add various additives, such as a pigment, a crosslinking agent, an antioxidant, a lubricant, a processing aid and a photostabilizer, which are known additives for a resin type floor material.

The floor material of the present invention is composed of a single layer of the same composition, the single layer, preferably, being formed into a tile. For example, the single layer can be formed into a tile of a regular square having one side of about 30 to 60 cm. The floor material may be obtained by calendering a single color composition by adding a pattern material, thereby imparting the floor material with splashed patterns. The floor material may also be obtained by laminate molding, such as calendering or pressing, of multicolor pulverized chips. Although there is no particular limitation imposed on the thickness of the floor material having a single layer structure, a thickness of about 2 to 4 mm is preferred.

The floor material having a single layer structure, as described above, can be produced as described in the following example. First, mixed in a ribbon blender are 25 to 45 parts by weight of an ethylene-vinyl acetate copolymer having a vinyl acetate content of 50% or greater and an MFR of 40 to 100, 55 to 75 parts by weight of polyethylene having an MFR of 1 to 20 and 400 to 700 parts by weight of an inorganic filler, and if necessary, 10 to 50 parts by weight of an ethylene-vinyl acetate copolymer having a vinyl acetate content of 15% or less and an MFR of 1 to 10, 10 to 50 parts by weight of an MMA-acrylate copolymer, 10 to 30 parts by weight of an ethylene-acrylate-maleic anhydride terpolymer, 1 to 30 parts by weight of a tackifier such as petroleum resin or rosin and a small amount of another additive. The resulting mixture is kneaded under a molten state in a Banbury mixer or pressure kneader. The kneaded mass is sheeted to have a predetermined thickness by a mixing roll or calendering roll, followed by cooling. The sheet is punched out into a predetermined size, whereby a target floor material is obtained.

The floor material thus obtained strongly adheres to an adhesive or wax ordinarily employed for floor materials as is shown by the data which will be described later. In addition, the floor material is superior to conventional PVC floor materials in terms of abrasion resistance, dimensional stability upon heating and residual indent. Since the ethylene-vinyl acetate copolymer having a vinyl acetate content of 50% or greater and an MFR of 40 to 100 g/10 min has been incorporated in this floor material, this resin with low crystallinity serves as a plasticizer, thereby imparting the floor material with appropriate flexibility, which improves the wetness with the ground and brings about excellent workability.

A detailed description will next be made of the use of the resin type interior material of the present invention as a skirt. As is also apparent from the test data which will be described later, a skirt comprising, as a basic resin, a mixture of 10 to 45 parts by weight of an ethylene-vinyl acetate copolymer having a vinyl acetate content of at least 50 wt. % and an MFR of 40 to 100 g/10 min and 55 to 90 parts by weight of a polyolefin resin having an MFR of 1 to 20 g/10 min as described above is extremely superior to a polyolefin type skirt of another composition which does not contain 10 to 45 parts by weight of an ethylene-vinyl acetate copolymer having a vinyl acetate concentration of at least 50 wt. % and an MFR of 40 to 100 g/10 min in bond strength with a conventional adhesive for skirts and also in resistance against whitening on bending.

When the vinyl acetate content of the ethylene-vinyl acetate copolymer which must have a vinyl acetate content of at least 50 wt. % and an MFR of 40 to 100 g/10 min, is less than 50%, the polar group concentration is too low to lose the effects for improving the adherence with an adhesive. At an MFR of less than 40 g/10 min, the difference with another resin in MFR becomes smaller, which makes it difficult to form a fine-particle-dispersed structure. At an MFR of greater than 100 g/10 min, on the other hand, the crystallinity of the resin becomes excessively low and stickiness appears when it is molded or formed.

When the ethylene-vinyl acetate copolymer having a vinyl acetate concentration of at least 50 wt. % and an MFR of 40 to 100 g/10 min is added in an amount of less than 10 parts by weight, high-concentration polar groups to be dispersed in the whole system become insufficient. When such an ethylene-vinyl acetate copolymer is added in an amount of greater than 45 parts by weight, on the other hand, a portion of the resin with less crystallinity becomes excessively large and stickiness appears when it is molded or formed.

In the case of a skirt, an inorganic filler is added in an amount of 150 to 400 parts by weight, more preferably, 200 to 300 parts by weight. Amounts of the inorganic filler of less than 150 parts by weight cause inconveniences such as deterioration in flame retardancy. Amounts exceeding 400 parts by weight, on the other hand, results in the skirt becoming brittle, leading to a deterioration in resistance against whitening on bending. Here, various known fillers conventionally used for building materials can be used. Examples of the fillers include calcium carbonate, magnesium carbonate, talc, silica, clay, glass fibers and natural synthetic fibers, with calcium carbonate powders having an average particle size of 500 $\mu$m or smaller being particularly preferred. Addition of aluminum hydroxide powders to the calcium carbonate powders yields a floor material having high flame retardancy.

To the skirt of the present invention, further addition of an ethylene-maleic anhydride copolymer or ethylene-methacrylic acid copolymer in an amount of 1 to 30 parts by weight markedly improves resistance against whitening on bending, imparts the sheet under a molten state with nerve at the time of production and improves productivity, because it is presumed that: ① the ethylene-maleic anhydride copolymer or ethylene-methacrylic acid copolymer has good compatibility with another resin component, and ② the maleic anhydride in the ethylene-maleic anhydride copolymer or methacrylic acid in the ethylene-methacrylic acid copolymer closely adheres to the inorganic filler so that the resin component and inorganic filler are adhered firmly.

Addition of the ethylene-maleic anhydride copolymer or ethylene-methacrylic acid copolymer even in an amount exceeding 30 parts by weight does not bring about further improvement in physical properties. At amounts of less than 1 part by weight, on the other hand, the above-described effects are not exhibited. Amounts of 10 to 30 parts by weight are, therefore, preferred, with 10 to 20 parts by weight being more preferred.

The skirt according to the present invention further comprising 1 to 30 parts by weight of a tackifier such as petroleum resin or rosin has more improved adhesion with an adhesive. Amounts exceeding 30 parts by weight make the color hue unstable and adversely affect the resistance against whitening on bending. Amounts of less than 1 part by weight, on the other hand, do not bring about any effects for improving adhesion. The amounts within the above range are, therefore preferred, with 10 to 20 parts by weight being more preferred.

As is also apparent from the test data which will be described later, the performance of the skirt is heightened only when a tackifier is added in the above-described amount to the above-specified resin type skirt of the present invention which already has, because of the above-described reasons, sufficiently improved adherence with an adhesive. Only the addition of a tackifier to a conventional skirt does not bring about sufficient adherence with an adhesive. It is possible to add various additives, such as pigment, crosslinking agent, antioxidant, lubricant and photostabilizer, to the skirt of the present invention since these are known additives for a resin type skirt.

The skirt of the present invention is able to have an ionomer resin stacked or laminated over the surface thereof and by this layer, high-level scratch resistance can be attained and whitening on bending is effectively prevented. Such advantages are brought about because an ionomer resin is very tough and has high surface hardness and appropriate elasticity and flexibility. An ionomer resin is also excellent in heat sealing properties so that good processability is attained not only when it is co-extruded but also it is adhered as a film. Alternatively, a skirt with a nylon resin stacked or laminated over its surface. also having high scratch resistance and whitening on bending can also be prevented effectively because a nylon resin is very tough and has high surface hardness and appropriate elasticity and flexibility.

No problem occurs when the nylon resin is adhered after co-extrusion. When it is adhered as a film, a film having a multilayer structure prepared by coextrusion of a nylon resin and a polyolefin resin can be used in order to improve heat sealing properties. In this case, it is needless to say that the film surface layer is made of a nylon resin, while the adhesive layer on the back side is made of a polyolefin resin. The surface layer of the ionomer resin or nylon resin may either be transparent, colored or made matted by the addition of a filler or pigment. A printed layer may be inserted between the surface layer and ground laver (i.e., subbing layer) in order to form a single design. The skirt according to the present invention is molded or formed to have a single layer or laminate structure. Although there is no particular limitation imposed on the thickness of it, thickness of about 1 to 3 mm is preferred.

The skirt according to the present invention can be produced as described in the following example. First, kneading takes place using 10 to 45 parts by weight of an ethylene-vinyl acetate copolymer having a vinyl acetate content of 50% or greater and an MFR of 40 to 100 g/10 min, 55 to 90 parts by weight of a polyolefin resin having an MFR of 1 to 20 g/10 min and 150 to 400 parts by weight of an inorganic filler, and if necessary, 10 to 50 parts by weight of an ethylene-vinyl acetate copolymer having a vinyl acetate concentration of 15% or less and an MFR of 1 to 20 g/10 min, 1 to 30 parts by weight of an ethylene-maleic anhydride copolymer or ethylene-methacrylic acid copolymer, 1 to 30 parts by weight of a tackifier such as petroleum resin or rosin and a small amount of an additive. The kneaded mass is sheet-formed through a die of an appropriate shape attached to an extruder, whereby a target skirt is obtained.

In order to produce a laminate skirt having a surface layer composed of an ionomer resin or nylon resin stacked, over the skirt obtained above, the surface layer is sheet-formed using another extruder and, immediately after that, the resulting sheet is laminated over the skirt. The skirt thus obtained strongly adheres to an adhesive ordinarily employed for skirts as is shown by the data which will be described later. In addition, it is superior to a skirt made of another polyolefin resin in another properties. Particularly, a skirt having a surface layer made of an ionomer resin or nylon resin is excellent in scratch resistance and resistance against whitening on bending.

The resin-type interior materials of the present invention will hereinafter be described by examples. It should however be borne in mind that the present invention is not limited by these examples.

EXAMPLE 1

In 40 parts by weight of an ethylene-vinyl acetate copolymer ("Soarlex R-DH", product of The Nippon Synthetic Chemical Industry Co., Ltd., MFR=50 g/10 min, which will hereinafter be abbreviated as "EVA1") having a vinyl acetate content of 70 wt. %, 60 parts by weight of low-density polyethylene ("Sumikathene E FV402", product of Sumitomo Chemical Co., Ltd., MFR=4 g/10 mm, which will hereinafter be called "Polyethylene" or "Low-density polyethylene") and 500 parts by weight of calcium carbonate powders having an average particle size of 100 μm were kneaded uniformly in a Banbury mixer. The kneaded mixture was formed into a sheet having a thickness of 2 mm by a mixing roll and calendering roll. After cooling, the sheet was punched out into a predetermined size, whereby a floor material sample was produced.

With regard to the resulting sample, adhesive tensile bond strength, adherence with wax, abrasion resistance and scratch resistance were evaluated in accordance with the following methods. The adhesive tensile bond strength was evaluated in accordance with the test method of dry tensile bond strength of JIS A 5536 (adhesive for vinyl floor tile, vinyl floor sheet). The adhesives employed were a vinyl acetate adhesive for vinyl type floor materials ("Nitto Cement S", produced by Nitto Boseki Co., Ltd.) and an urethane one-component type adhesive for vinyl type floor materials ("Nitto Cement UN", produced by Nitto Boseki Co., Ltd.). In this test, attention must be paid to the broken state, as well as the tensile bond strength. The broken position at AF (interface between adhesive and floor material) indicates weak adherence of the floor material with the adhesive. The broken position at F (the floor material itself) or GA (interface between the ground and adhesive) is desired. As a result, as shown below in Table 1, both vinyl acetate adhesive and urethane adhesive exhibits sufficient tensile bond strength and there exists no problem in the broken state.

The adherence with wax was evaluated by applying a wax for floor materials ("STATUS", produced by Johnson Company, Ltd.) to the surface of the sample three times, cutting the thus-treated surface to form an X-shaped notch thereon, adhering an pressure-sensitive adhesive tape (corrugated board wrapping tape produced by Nichiban Co., Ltd.) to cover the notch, allowing the tape to adhere closely to the wax layer, peeling off the adhesive tape at once and observing the peeling condition of the wax layer from the sample surface. The evaluation was made in accordance with the following 5-stage system:

5: The wax layer is not peeled off at all.
4: The wax layer is partially peeled off at the X-shaped notch portion.
3: The whole wax layer at the X-shaped notch portion is peeled off.
2: In addition, the wax layer is partially peeled off at the portion other than the X-shaped notch portion.
1: The whole wax layer is peeled off. Floor materials evaluated as 4 or greater are regarded to have sufficient performance.

The abrasion resistance was measured in accordance with the test method of JIS A 1453, more specifically, by abrading the surface of the sample with a rubber ring having abrasive paper wound thereto 3000 times and then measuring a decrease in thickness caused by abrasion. The abrasive paper is changed to a new one every 500 times, because it is clogged by abrasion. As a result, a decrease in thickness by abrasion was 0.92 mm as shown below in Table 1.

For the evaluation of scratch resistance, a tester defined in FEDERAL TEST METHOD STANDARD METHOD 7711 "SCRATCH RESISTANCE" is used. Without any particular pre-treatment, the sample was adhered onto the circular table of the tester. While the table was turned, the sample was scratched with a scratching blade to which a load of 500 g had been applied. The width and depth of the scratch were measured. As a result, a scratch of 3.0 mm wide and 0.18 mm deep was formed as shown below in Table 1.

EXAMPLES 2 TO 6

In a similar mariner to Example 1 except for the further addition of 20 parts by weight of an ethylene-vinyl acetate copolymer ("Evatate D3021", produced by Sumitomo Chemical Co., Ltd., MFR=7 g/10 min., which will hereinafter be abbreviated as "EVA2") having a vinyl acetate concentration of 6 wt. % to the mixture, a floor sample of Example 2 was produced.

In a similar manner to Example 1, except for the further addition of 30 parts by weight of an MMA-butyl acrylate copolymer (content of butyl acrylate: 30 wt. %, which will hereinafter be abbreviated as "MMA-BA") to the mixture, a floor sample of Example 3 was produced.

In a similar manner to Example 1, except for the further addition of 20 parts by weight of an ethylene-acrylate-maleic anhydride terpolymer ("Bondine FX8000", produced by Sumitomo Chemical Co., Ltd., which will hereinafter be called "Modified polyethylene") to the mixture, a floor sample of Example 4 was produced.

In a similar manner to Example 1, except for the further addition of 20 parts by weight of a tackifier ("Hi-rez 1515T", which will hereinafter be called "Tackifier 1") to the mixture, a floor sample of Example 5 was produced.

In a similar manner to Example 1, except for the further addition of 30 parts by weight of MMA-BA used in Example 3, 20 parts by weight of Modified polyethylene used in Example 4 and 20 parts by weight of Tackifier 1 used in Example 5, a floor sample of Example 6 was produced.

With regard to those floor samples obtained in Examples 2 to 6, adhesive tensile bond strength, adherence with wax, abrasion resistance and scratch resistance were evaluated in the same manner as in Example 1. The results are shown in Table 1 below.

Comparative Examples 1 to 5

Five parts by weight of EVA1 used in Example 1, 95 parts by weight of Low-density polyethylene used in Example 1 and 500 parts by weight of calcium carbonate used in Example 1 were mixed. The resulting mixture was treated in a similar manner to Example 1, whereby a floor sample of Comparative Example 1 was produced.

Hundred parts by weight of Low-density polyethylene used in Example 1 and 500 parts by weight of calcium carbonate used in Example 1 were mixed. The resulting mixture was treated in a similar manner to Example 1, whereby a floor sample of Comparative Example 2 was produced.

To the mixture obtained in Comparative Example 2, 20 parts by weight of Tackifier 1 employed in Example 5 was added. The resulting mxiture was treated in a similar manner to Example 1, whereby a floor sample of Comparative Example 3 was produced.

Hundred parts by weight of an ethylene-vinyl acetate copolymer ("Evaflex EV40L" produced by Mitsui Chemical Co., Ltd., MFR=2 g/10 min, which will hereinafter be abbreviated as "EVA3") having a vinyl acetate content of 40 wt. % and 500 parts by weight of calcium carbonate used in Example 1 were mixed, followed by treatment in a similar manner to Example 1, whereby a floor sample of Comparative Example 4 was produced. To the mixture of Comparative Example 4, 20 parts by weight of Tackifier 1 used in Example 5 was added, followed by treatment in a similar manner to Example 1, whereby a floor sample of Comparative Example 5 was produced.

With regard to those floor samples obtained in Comparative Examples 1 to 5, adhesive tensile bond strength, adherence with wax, abrasion resistance and scratch resistance were evaluated in the same manner as in Example 1. The results are shown in Table 1 below.

TABLE 1

|  | Examples | | | | | | Comparative Examples | | | | |
| --- | --- | --- | --- | --- | --- | --- | --- | --- | --- | --- | --- |
|  | 1 | 2 | 3 | 4 | 5 | 6 | 1 | 2 | 3 | 4 | 5 |
| EVA1 (parts by weight) | 40 | 40 | 40 | 40 | 40 | 40 | 5 | | | | |
| Polyethylene (parts by weight) | 60 | 60 | 60 | 60 | 60 | 60 | 95 | 100 | 100 | | |
| EVA2 (parts by weight) | | 20 | | | | | | | | | |
| EVA3 (parts by weight) | | | | | | | | | | 100 | 100 |
| MMA-BA (parts by weight) | | | 30 | | | 30 | | | | | |
| Calcium carbonate (parts by weight) | 500 | 500 | 500 | 500 | 500 | 500 | 500 | 500 | 500 | 500 | 500 |
| Modified polyethylene (parts by weight) | | | | 20 | | 20 | | | | | |
| Tackifier 1 (parts by weight) | | | | | 20 | 20 | | | 20 | | 20 |
| Various properties | | | | | | | | | | | |
| Tensile bond stress (kg/cm$^2$) | | | | | | | | | | | |
| Vinyl acetate | 7.1 | 7.2 | 6.9 | 6.9 | 8.2 | 8.1 | 4.0 | 3.8 | 4.1 | 4.5 | 4.8 |
| Peeling condition | GA | GA | GA | GA | GA | GA | AF | AF | AF | AF | AF |
| Urethane | 10.8 | 10.7 | 10.1 | 10.0 | 11.2 | 11.3 | 5.5 | 5.5 | 5.9 | 7.2 | 7.5 |
| Peeling condition | GA | GA | GA | GA | GA | GA | AF | AF | AF | AF | AF |
| Adherence with wax (1 to 5) | 4 | 4 | 4 | 4 | 5 | 5 | 2 | 1 | 1 | 2 | 2 |
| Abrasion resistance (mm) | 0.92 | 1.00 | 0.90 | 0.75 | 0.93 | 0.72 | 0.86 | 0.81 | 0.82 | 0.98 | 0.97 |
| Scratch Resistance | | | | | | | | | | | |
| Width (mm) | 2.9 | 2.8 | 2.1 | 2.8 | 3.0 | 2.0 | 2.7 | 2.8 | 2.8 | 3.2 | 3.3 |
| Depth (mm) | 0.19 | 0.17 | 0.11 | 0.18 | 0.19 | 0.12 | 0.18 | 0.20 | 0.19 | 0.21 | 0.22 |

From the viewpoint of the tensile bond strength, Table 1 shows that floor materials obtained in Examples 1 to 6 using EVA1 have sufficient tensile bond strength whether a vinyl acetate adhesive or urethane adhesive is used and no problem exits in the broken state. In particular, the tensile bond strength is higher when the tackifier is added as in Example 5 or 6. On the other hand, the floor material in Comparative Example 1 containing EVA1 in an amount of less than 25 parts by weight or the floor material of each of Comparative Examples 2 to 5 free of EVA1 has not sufficient tensile bond strength even if the tackifier is added or EVA3 having a relatively high vinyl acetate content is added. Also from the broken state of each of them, it is seen that the sufficient adherence between the floor material and adhesive is not attained. Moreover. in the adherence with wax, there appears a remarkable difference between the floor materials obtained in Examples 1 to 6 and those obtained in Comparative Examples 1 to 5.

Concerning abrasion resistance, comparison between Example 1 and 4 or Example 5 and 6 shows that the addition of Modified polyethylene contributes to a marked improvement in abrasion resistance. Floor materials of Comparative Example 1 to 3 containing polyethylene having a high crystallinity also exhibited relatively good abrasion resistance, but it is needless to say that they are not suited as floor materials because of serious inferiority in other physical properties. Concerning scratch resistance, comparison between Examples 1 and 3 and Example 4 to 6 shows that judging from a decrease in both the width and depth of the scratch, addition of MMA-BA contributes to a marked improvement in the scratch resistance.

As is apparent from the above description, the polyolefin floor materials according to the present invention can be used without any problem, having largely improved workability and maintenance properties for the purpose of attaining strong adherence with a conventional floor adhesive or wax, and, excellent durability with high abrasion resistance and scratch resistance.

EXAMPLE 7

In 40 parts by weight of an ethylene-vinyl acetate copolymer (similar to "EVA1" used in Example 1) having a vinyl acetate content of 70 wt. %, 60 parts by weight of an ethylene-methyl methacrylate copolymer ("Acrift CM8014", produced by Sumitomo Chemical Co., Ltd., MFR=4 g/10 min which will hereinafter be called "Polyolefin"), 200 parts by weight of calcium carbonate powder having an average particle size of 100 μm were kneaded uniformly, and then the kneaded mixture was formed into a sheet having a thickness of 2 mm through a die of a predetermined shape attached to an extruder, whereby a skirt sample was produced.

Concerning the resulting sample, the adhesive tensile bond strength and resistance against whitening on bending were evaluated by the following methods. The adhesive tensile bond strength was measured in accordance with the test method of the dry 90° peel bond strength in JIS A 5536 (adhesive for vinyl floor tile vinyl floor sheet). The adhesives employed were a vinyl acetate adhesive for vinyl type skirts ("Nitto Cement SH" produced by Nitto Boseki Co., Ltd., which will hereinafter be called "adhesive 1") and an emulsion adhesive for vinyl type skirts ("EM Habaki", produced by Tilement Co., Ltd., which will hereinafter be called "adhesive 2"). As a result, as shown below in Table 2, sufficient peel bond strength were attained by both adhesives.

The resistance against whitening on bending was tested as follows. The skirt samples were placed under an environment of a temperature of 20° C. and humidity of 65% for 48 hours and then wound around 180° of rods having a round cross-section and different in diameter under the same environment. The diameter of the rod at which whitening of the skirt sample occurs is designated as an index of the whitening of the skirt sample on bending. For example, when a skirt sample is whitened by winding of it around 180° of the rod having a diameter of 10 mm, the whitening of the skirt sample on bending is designated as 10R. In this test, the smaller the numeral is, the resistance against whitening on bending is better. As a result, the skirt sample exhibits sufficient resistance against whitening on bending as shown below in Table 2.

EXAMPLES 8 TO 11

In a similar manner to Example 7 except for the further addition of 10 parts by weight of Modified polyethylene used in Example 4, a skirt sample of Example 8 was produced.

In a similar manner to Example 7 except for further addition of 10 parts by weight of a tackifier ("Hi-rez T300X", produced by Mitsui Chemical Co., Ltd., which will hereinafter be called "Tackifier 2"), a skirt sample of Example 9 was produced.

On the surface layer of the skirt obtained in Example 7, an ionomer resin ("Himilan 1652", produced by Mitsui Chemical Co., Ltd., MFR=5 g/10 min or less, which will hereinafter be called "Ionomer") was stacked by co-extrusion to give a film thickness of 100 μm, whereby a floor sample of Example 10 was produced. A nylon resin was similarly stacked to give a film thickness of 100 μm to produce a skirt sample of Example 11.

With regard to the skirt samples obtained in Examples 7 to 11, the adhesive dry 90° peel bond strength and resistance against whitening on bending were evaluated in the same manner as in Example 7. The results are shown in Table 2 below.

Comparative Examples 6 to 11

Twenty parts by weight of EVA1 used in Example 7, 80 parts by weight of Polyolefin used in Example 7, 200 parts of calcium carbonate used in Example 7 were mixed. The resulting mixture was treated in a similar manner to Example 7, whereby a skirt sample of Comparative Example 6 was produced.

Hundred parts by weight of Polyolefin used in Example 7 and 200 parts by weight of calcium carbonate used in Example 7 were mixed. The resulting mxiture was treated in a similar manner to Example 7, whereby a skirt sample of Comparative Example 7 was produced.

To the mixture of Comparative Example 7 was added further 10 parts by weight of Tackifier 2 used in Example 10. The resulting mxiture was treated in a similar manner to Example 7, whereby a skirt sample of Comparative Example 8 was produced.

Hundred parts by weight of EVA3 used in Comparative Example 4 and 200 parts by weight of calcium carbonate used in Example 7 were mixed. The resulting mixture was treated in a similar manner to Example 7, whereby a skirt sample of Comparative Example 9 was produced. To the mixture of Comparative Example 9, 10 parts by weight of Modified polyolefin used in Example 8 was added. The resulting mxiture was treated in a similar manner to Example 7, whereby a skirt sample of Comparative Example 10 was obtained. To the mixture of Comparative Example 9 was added 10 parts by weight of Tackifier 2 used in Example 9. The resulting mixture was treated in a similar manner to Example 7, whereby a skirt sample of Comparative Example 11 was produced.

Concerning the skirt samples obtained in Comparative Examples 6 to 11, the adhesive dry 90° peel bond strength and resistance against whitening on bending were similarly evaluated. The results are shown in Table 2.

adhesive for interior materials so that it is useful particularly as a floor material or skirt.

When used as a floor material, the polyolefin resin type interior material can be obtained as a polyolefin type floor material, particularly tile-shaped floor material which is formed of a single layer and has, in addition to the above-described properties, excellent abrasion resistance and excellent adherence with a wax. When used as a skirt, the polyolefin resin type interior material can be obtained as a

TABLE 2

|  | Examples | | | | | Comparative Examples | | | | | |
| --- | --- | --- | --- | --- | --- | --- | --- | --- | --- | --- | --- |
|  | 7 | 8 | 9 | 10 | 11 | 6 | 7 | 8 | 9 | 10 | 11 |
| EVA1 | 40 | 40 | 40 | 40 | 40 | 5 | | | | | |
| Polyolefin | 60 | 60 | 60 | 60 | 60 | 95 | 100 | 100 | | | |
| Calcium carbonate | 200 | 200 | 200 | 200 | 200 | 200 | 200 | 200 | 200 | 200 | 200 |
| Modified polyethylene | | 10 | | | | | | | | 10 | |
| Tackifier 2 | | | 10 | | | | | 10 | | | 10 |
| EVA3 | | | | | | | | | 100 | 100 | 100 |
| Surface layer: Ionomer resin | | | | Stacked | | | | | | | |
| Surface layer: Nylon resin | | | | | Stacked | | | | | | |
| Various properties | | | | | | | | | | | |
| Adhesive bond strength (kg/2.5 cm) | | | | | | | | | | | |
| Adhesive 1 | 2.1 | 2.1 | 2.4 | 2.0 | 2.2 | 1.1 | 0.8 | 1.0 | 1.1 | 1.0 | 1.2 |
| Adhesive 2 | 1.7 | 1.6 | 1.9 | 1.7 | 1.6 | 0.9 | 0.8 | 1.0 | 1.0 | 0.9 | 1.1 |
| Resistance against whitening on bending | 6R | 3R | 6R | No whitening | No whitening | 10R | 15R | 15R | 13R | 11R | 13R |

From the viewpoint of tensile bond strength, it is apparent from Table 2 that the skirt samples obtained in Examples 7 to 11 using EVA1 each exhibit sufficient tensile bond strength irrespective of the kind of the adhesive. Particularly, when a tackifier is added as in Example 9, the floor sample exhibits higher tensile bond strength. The skirt sample of Comparative Example containing EVA1 in an amount less than 10 parts by weight or those of Comparative Examples 7 to 11 free of EVA1 do not exhibit sufficient tensile bond strength even if a tackifier is added or EVA3 having a relatively high vinyl acetate content is incorporated, giving insufficient adherence between the skirt sample and adhesive.

The resistance against whitening on bending is improved by the addition of modified polyethylene. A further marked improvement is brought by stacking of an ionomer resin or nylon resin onto the surface of the skirt sample, wherein no whitening occurs even if the sample is bent at 180° without winding to a rod.

As is apparent from the above description, the polyolefin type skirt according to the present invention adheres firmly by a conventional skirt adhesive and in addition, it has no problem in resistance against whitening on bending, indicating excellent workability. The skirt having thereon an ionomer or nylon resin stacked as a surface layer has high scratch resistance so that it is a skirt also excellent in durability.

The polyolefin resin type interior material according to the present invention is free of a halogen and a phthalate series plasticizer, is substitutable for a conventional PVC resin type interior material, has excellent scratch resistance, designing applicability and workability, and exhibits excellent adhesive strength and adherence to a conventional polyolefin type skirt, which has, in addition to the above-described properties, excellent resistance against whitening on bending.

We claim:

1. A resin type interior material comprising 10 to 45 parts by weight of an ethylene-vinyl acetate copolymer having a vinyl acetate concentration of at least 50 wt. %, 55 to 90 parts by weight of a polyolefin resin, and 100 to 700 parts by weight of an inorganic filler, wherein the ethylene-vinyl acetate copolymer has a melt flow rate (which will hereinafter be abbreviated as "MFR") greater by at least 20 g/10 min than the-polyolefin resin.

2. The resin type interior material according to claim 1, further comprising 10 to 50 parts by weight of an ethylene-vinyl acetate copolymer having a vinyl acetate concentration not greater than 15% and having an MFR of from 1 to 20 g/10 min.

3. A floor material obtained by single-layer molding or forming of a mixture comprising 25 to 45 parts by weight of an ethylene-vinyl acetate copolymer having a vinyl acetate concentration of at least 50 wt. % and an MFR of 40 to 100 g/10 min, 55 to 75 parts by weight of a polyolefin resin having an MFR of 1 to 20 g/10 min and 400 to 700 parts by weight of an inorganic filler.

4. The floor material according to claim 3, further comprising 10 to 50 parts by weight of a copolymer of methyl methacrylate and an acrylate.

5. The floor material according to claim 3 further comprising 10 to 30 parts by weight of an ethylene-acrylate-maleic anhydride terpolymer.

6. The floor material according to claim 5, further comprising 1 to 30 parts by weight of a tackifier.

7. The floor material according to claim 6, which is formed into a tile.

8. A skirt obtained by mixing 10 to 45 parts by weight of an ethylene-vinyl acetate copolymer having a vinyl acetate concentration of at least 50 wt. % and an MFR of 40 to 100 g/10 min, 55 to 90 parts by weight of a polyolefin resin having an MFR of 1 to 20 g/10 min and 150 to 400 parts by weight of an inorganic filler.

9. The skirt according to claim 8, further comprising 1 to 30 parts by weight of an ethylene-maleic anhydride copolymer or ethylene-methacrylic acid copolymer.

10. The skirt according to claim 8 further comprising 1 to 30 parts by weight of a tackifier.

11. The skirt according to claim 10, wherein an ionomer resin has been stacked as a surface layer.

12. The skirt according to claim 10, wherein a nylon resin has been stacked as a surface layer.

* * * * *